Patented Dec. 22, 1931

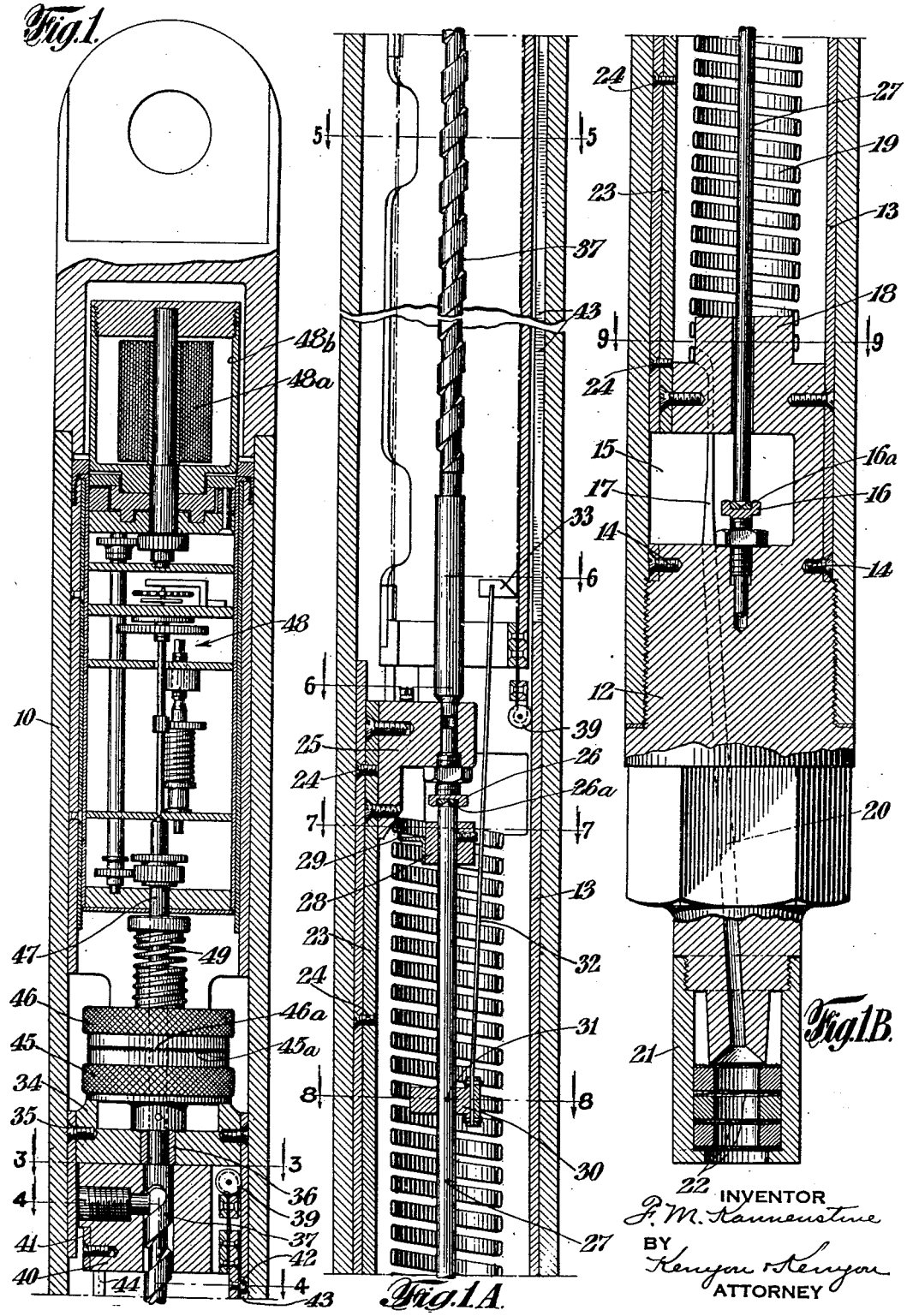

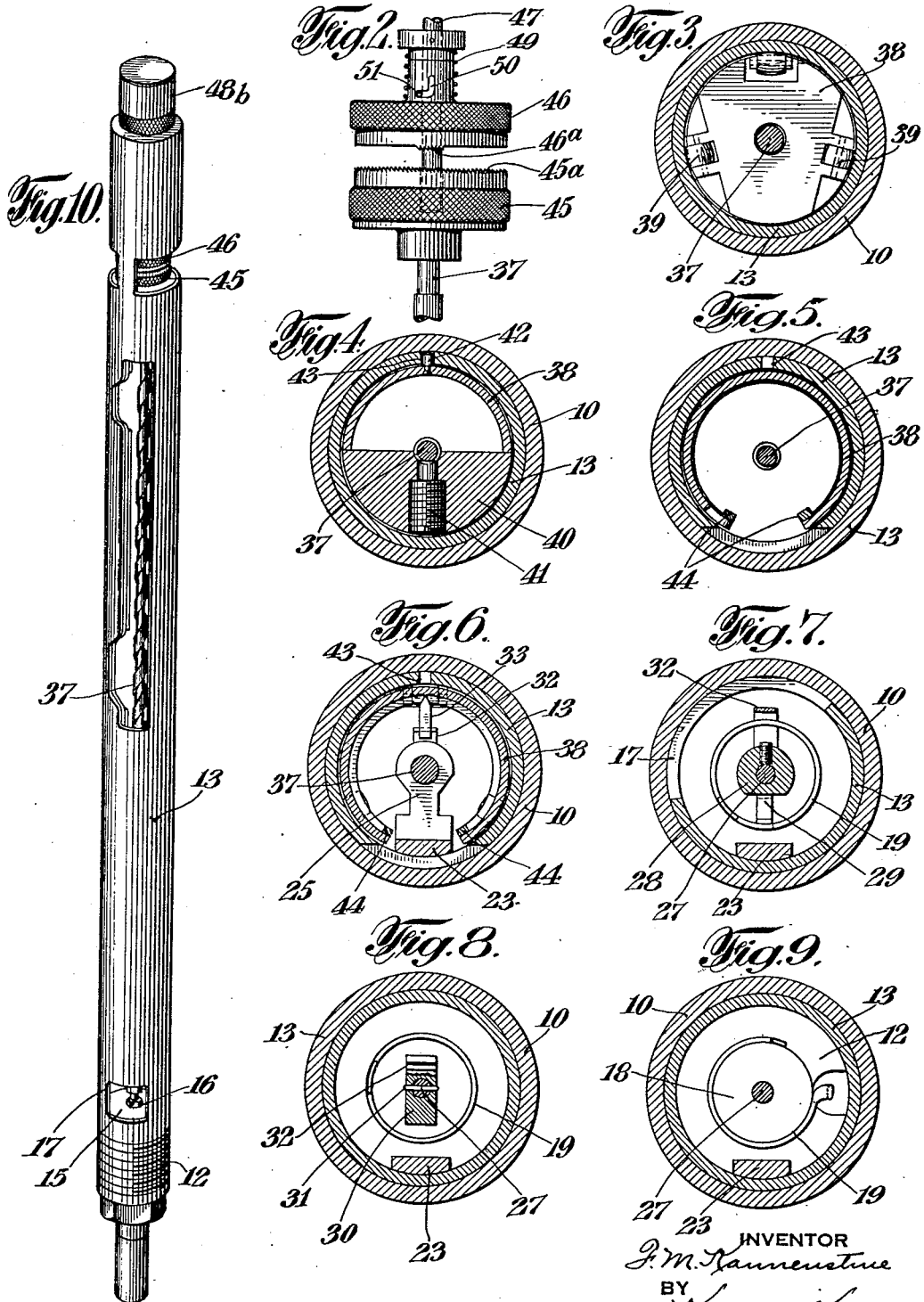

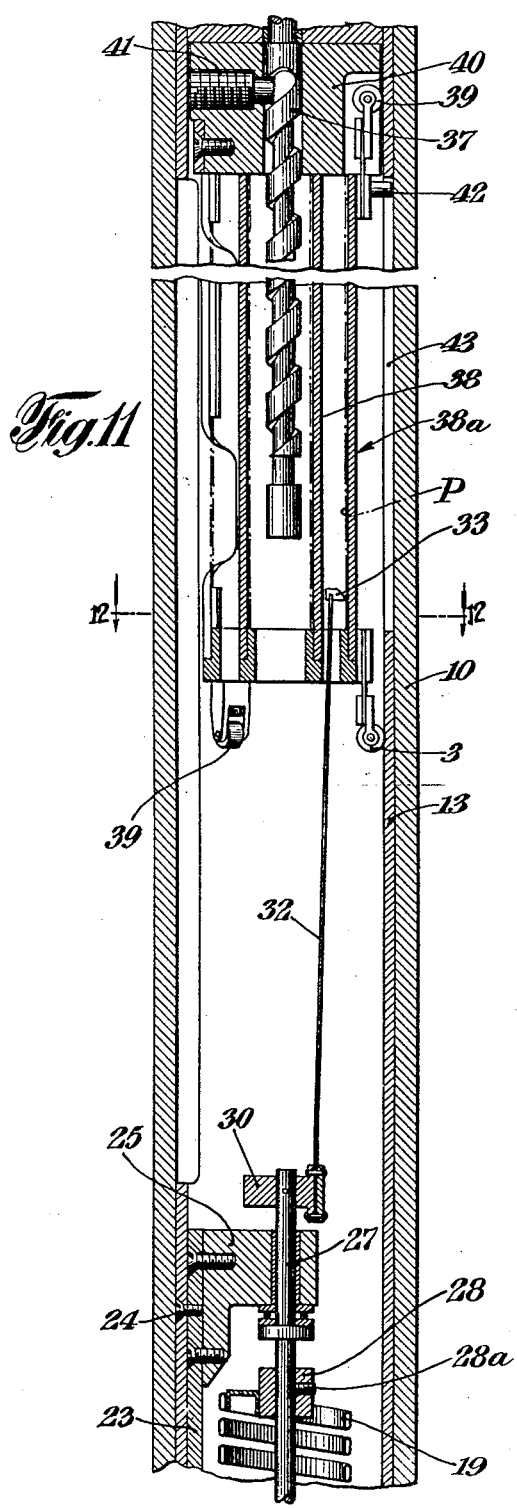
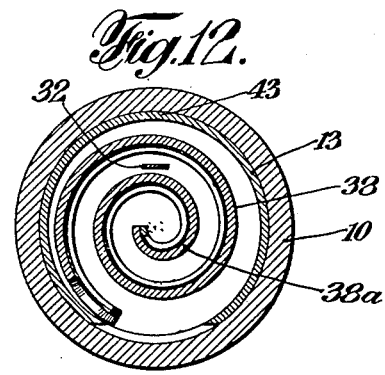
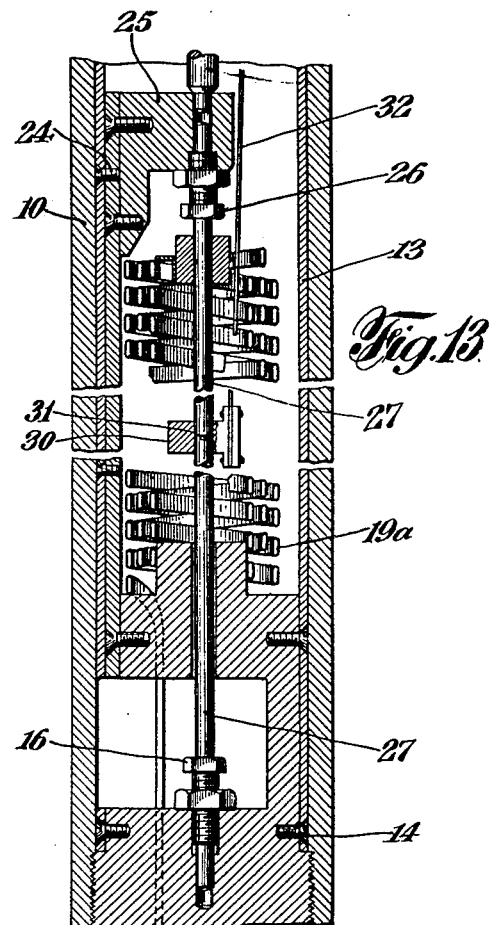

1,837,222

UNITED STATES PATENT OFFICE

FABIAN M. KANNENSTINE, OF BLOOMFIELD, NEW JERSEY, ASSIGNOR TO GEOPHYSICAL RESEARCH CORPORATION, OF NEW YORK, N. Y., A CORPORATION OF NEW JERSEY

PRESSURE RECORDING GAUGE

Application filed January 18, 1930. Serial No. 421,615.

This invention relates to pressure recording gauges and has for an object an improved pressure recording gauge, particularly adapted for use in determining pressures at different depths within bore holes extending into the earth.

A gauge embodying the invention comprises a metal tubing helix, one end of which is open to the atmosphere and the other end of which is sealed. Variations in pressure within the tubing effect twisting of the helix. One end of the helix is fixed and its other end is connected with a stylus, the position of which varies with the twisting of the helix. A properly lined strip of paper is caused to move past the stylus at a uniform speed so that there is recorded on the paper a chart of the pressures at different times. The gauge is enclosed in a protective casing so that it may be let down into a bore hole without danger of injury thereto. The instrument may be used to obtain a record of pressures over definite periods at selected depths and this manner of use will depend upon the conditions under which it is used. Various ways of utilizing this instrument for recording pressures will be apparent to those skilled in the art.

Other objects, novel features and advantages of this invention will be apparent from the following specification and accompanying drawings, wherein:

Fig. 1 is a vertical section through a portion of an instrument embodying the invention;

Fig. 1—A is a like section of an adjacent portion of the instrument;

Fig. 1—B is a similar section of the remaining portion of the instrument;

Fig. 2 is an elevation of the clutch mechanism shown in Fig. 1.

Figs. 3 to 9 inclusive are sections taken on the line 3—3, 4—4, 5—5, 6—6, 7—7, 8—8, and 9—9 respectively of Figs. 1, 1—A, and 1—B.

Fig. 10 is a perspective view of the instrument with its protective casing removed;

Fig. 11 is a fragmentary vertical section through a modified form of instrument;

Fig. 12 is a section on the line 12—12 of Fig. 11, and

Fig. 13 is a fragmentary section of a further modification of the invention.

The gauge is contained within a casing 10 closed at one end by a rigidly attached cap 11 and at the opposite end by a plug 12 which constitutes a part of the gauge. A metal tube 13 is attached to the plug 12 by bolts 14. The plug 12 is cut away as at 15 and in the rear wall of the recess thus formed there is provided an adjustable support 16 in which is mounted a bearing jewel 16ª. The tube 13 is provided with an aperture 17 through which access may be had to the support 16. At the inner end of the plug 12 there is provided a projection 18 which is surrounded by one end of a helix 19 which is formed from flat tubing. One end of the tubing communicates with a channel 20 in the plug 12. A cap 21 is threaded on the plug 12 and covers the open end of the channel 20, the cap being provided with a plurality of screens 22. A bar 23 is located in contact with the inner wall of the tube 13 and is held by bolts 24. The bar 23 carries a bracket 25 at one end in which is provided an adjustable support 26 provided with a bearing jewel 26ª. A shaft 27 is rotatably supported by the bearing jewels 16ª and 26ª. A collar 28 is fixed to one end of the shaft 27 and is provided with a bracket 29 to which is fixed the inner end of the helix 19, the end of the tubing being sealed. A collar 30 is mounted on the shaft 27 and is held against rotation thereon by a set screw 31. This collar supports a resilient arm 32 having a stylus 33 at its free end.

A collar 34 is held in the tube 13 by bolts 35 and is provided with a bearing sleeve 36. A feed screw 37 has one end rotatably mounted in the sleeve 36 and has its other end received within a bore in the bracket 25. A carriage 38 is supported within the tube 13 by rollers 39 arranged at the ends of the carriage and engaging the inner wall of the tube. The carriage comprises a longitudinally slotted tubular member provided at one end with a head 40 in which is mounted a pin 41 projecting into the groove of the feed screw 37, so that rotation of the latter effects reciprocation of the former. The carriage is held against rotation by a roller 42 carried by the carriage and extending into longitudinal slot 43 in the tube 13. The carriage is provided with ridges 44 which are engaged by the edges of a sheet of paper which lies against the inner wall of the carriage and which is engaged by the stylus 33.

A clutch member 45 is fixed to the lead screw 37 and is adapted to co-operate with a clutch member 46 slidably mounted on a shaft 47 which is rotated at a uniform rate of speed by clock mechanism 48. The clutch member 45 is provided with a circle of teeth 45$^a$ and the clutch member 46 is provided with a short sector of teeth 46$^a$ which engage with the teeth 45$^a$ to cause the clutch members to rotate in unison.

A spring 49 presses the clutch member 46 into engagement with the clutch member 45 and the clutch member 46 is provided with a bayonet slot 50 into which projects a pin 51 carried by the shaft 47. The pin and slot provide means for maintaining the clutch member 46 out of engagement with the clutch member 45. The tube 13 is cut away at two places adjacent the clutch members 45 and 46 to provide easy access thereto. The clock mechanism 48 is driven by a spring 48$^a$ contained with a cap 48$^b$ which extends beyond the tube 13 and is rotatable for the purpose of winding the spring.

The gauge is prepared for use by placing a piece of properly lined paper P in the carrier 36 with the latter in the position shown in Figs. 1, 1—A and 1—B, the stylus 33 being in contact with the lower edge of the paper and the clutch member 46 being disengaged from the clutch member 45. The clutch member 46 is then engaged with the clutch member 45 and the casing 10 is slipped over the tube 13 and screwed on to the plug 12. The feed screw 37 is rotated by the clock mechanism and the carriage 36 will move towards the plug 12 at a constant speed, the bracket 25 being received within the slot in the carriage. The stylus 33 traces a line on the paper P and is caused to move transversely to the direction of movement of the carriage by twisting movement of the helix 19. Twisting movement of the helix 19 is effected by variations in pressure and as the end of the helix is fixed to the collar 28, corresponding rotation of the shaft 25 is effected, thereby causing movement of the stylus 33. The paper P is provided with cross lines to indicate elapsed time and with longitudinal lines to indicate movement of the stylus from its zero position due to variations in pressure. The stylus may be set at any determined zero position with respect to the paper P by loosening the set screw 31 and rotating the collar 30 on the shaft 27.

The instrument may be lowered into the drill hole in which it is desired to determine the pressures. The pressure within the helix 13 will be the same as the pressure of the atmosphere surrounding the instrument inasmuch as the lower end of the helix is connected to the conduit 20 which communicates with the atmosphere through the cap 21. The stylus 33 will, therefore, assume a position indicative of the pressure of the atmosphere surrounding the instrument. The instrument may be suspended at a definite depth in a bore hole and a record of the pressure at that depth over a given length of time may be recorded or the instrument may be used to obtain a record of pressures at different depths in the bore hole.

The pressure at different depths is determinable by knowing the time at which the apparatus is started and the times at which it is suspended at the various depths.

In the modification disclosed in Fig. 12, the carriage 38 is equipped with an involute support 38$^a$ for the paper P, thus making it possible to use a wider sheet of paper than with the modification disclosed in 1, 1—A and 1—B and to obtain a record of pressure variations on a larger scale. In this modification, the shaft 27 extends into the bracket 25 and carries the collar 30 to which is attached the resilient arm 32 which supports the stylus 33. The closed end of the helix 19 is attached to the collar 28, which in turn is fixed to the shaft 27 by the set screw 28$^a$. The stylus 33 may be set at any desired zero position with respect to the paper P by releasing the set screw 28$^a$ and rotating the shaft 27.

In the modification disclosed in Fig. 13, there is provided a multiple helix 19$^a$ composed of a plurality of concentric helices serially connected, preferably being made up from a single length of tubing. In this modification, the shaft 27 is mounted in the same manner as shown in Figs. 1, 1—A and 1—B and the stylus 33 is attached to the shaft 27 in the same manner as shown in these figures. The multiple helix provides a greater length of tubing and makes the instrument more sensitive by producing a greater change in the position of the stylus for like pressure variations. The modification disclosed in Figs. 11, 12 and 13 may be combined to produce an extremely sensitive instrument which will make a large scale record.

It is of course understood that various modifications may be made in the device above described, without in any way departing from the spirit of the invention as defined in the appended claims.

I claim:

1. A device of the character described comprising a helix formed from tubing open at one end and closed at the other, means for rigidly supporting one end of said helix, a stylus connected to the other end of said helix and movable therewith, a tubular carriage having provision for supporting a recording sheet in contact with its inner wall, and means for moving said carriage axially of said helix at a constant speed, said styles being arranged within said carriage to engage said sheet.

2. A device of the character described comprising a helix formed of hollow tubing open at one end and closed at the other, means for rigidly supporting the open end of said helix, a stylus connected to the closed end of said helix, a tubular carriage having provision for supporting a recording sheet in contact with its inner wall, and means for moving said carriage axially of said helix at a constant speed, said stylus being arranged within said carriage to engage said sheet.

3. A device of the character described comprising a tube, a helix within said tube, said helix being formed of tubing open at one end and closed at the other, means for rigidly supporting the open end of said tubing, a stylus connected to the closed end of said tubing, a tubular carriage having provision for supporting a recording sheet in contact with its inner wall, and means for moving said carriage axially of said helix at a constant speed, said stylus being arranged within said carriage to engage said sheet.

4. A device of the character described comprising a helix formed of hollow tubing having one end open and the other end closed, means for rigidly supporting the closed end of said tubing, a shaft co-axial with said helix, connections between the closed end of said tubing and said shaft, a stylus supported by said shaft, a tubular carrier having provision for supporting a sheet of recording paper in contact with its inner wall, and means for moving said carriage axially of said helix at a constant speed, said stylus being arranged within said carrier to engage said paper.

5. A device of the character described comprising a helix formed of hollow tubing having one end open and the other end closed, means for rigidly supporting the closed end of said tubing, a shaft co-axial with said helix, connections between the closed end of said tubing and said shaft, a stylus supported by said shaft, a tubular carrier having provision for supporting a sheet of recording paper in contact with its inner wall, a lead screw co-axial with said helix, means for rotating said lead screw at a constant speed, and a follower supported by said carriage and projecting into the groove of said lead screw, said stylus being arranged within said carrier to engage said paper.

6. A device of the character described comprising a helix formed of hollow tubing open at one end and closed at the other, means for rigidly supporting one end of said helix, a stylus connected to the other end of said helix, an involute support for a sheet of recording paper, and means for moving said support relative to said stylus at a constant speed.

7. A device of the character described comprising a plurality of connected co-axial helices formed of metal tubing open at one end and closed at the other end, means for rigidly supporting one end of said tubing, a stylus connected to the other end of said tubing, a carriage for supporting a sheet of recording paper, and means for moving said carriage relative to said stylus at a constant speed.

8. A device of the character described comprising a plurality of connected co-axial helices formed of metal tubing open at one end and closed at the other end, means for rigidly supporting one end of said tubing, a stylus connected to the other end of said tubing, a carriage having an involute portion for supporting a sheet of recording paper, and means for moving said carriage relatively to said stylus at a constant speed.

In testimony whereof, I have signed my name to this specification.

FABIAN M. KANNENSTINE.